A. F. GUE.

Car-Brake.

No. 6,411.

Reissued May 4, 1875.

Witnesses;
Helen E. Metcalf
Samuel C. Oliver

Inventor;
Albert F. Gue,
Per C. A. Shaw
Atty.

THE GRAPHIC CO. PHOTO.-LITH. 39 & 41 PARK PLACE, N.Y.

UNITED STATES PATENT OFFICE.

ALBERT F. GUE, OF CHICAGO, ILLINOIS, ASSIGNOR TO LUMAN JENISON, OF JENISONVILLE, MICHIGAN, JAS. M. KELLY AND GEO. E. PLUMBE, OF AUSTIN, ILLINOIS, AND SAML. W. COZZENS AND GEO. F. FIELD, OF BOSTON, MASSACHUSETTS.

IMPROVEMENT IN CAR-BRAKES.

Specification forming part of Letters Patent No. 151,118, dated May 19, 1874; reissue No. 6,411, dated May 4, 1875; application filed March 5, 1875.

*To all whom it may concern:*

Be it known that I, ALBERT F. GUE, formerly of Eastmanville, in the county of Ottawa and State of Michigan, but now of Chicago, in the county of Cook, State of Illinois, have invented a certain new and useful Improvement in Car-Brakes, of which the following is a description sufficiently full, clear, and exact to enable any person skilled in the art or science to which my invention appertains to make and use the same, reference being had to the accompanying drawing forming a part of this specification, in which—

Figure 1:
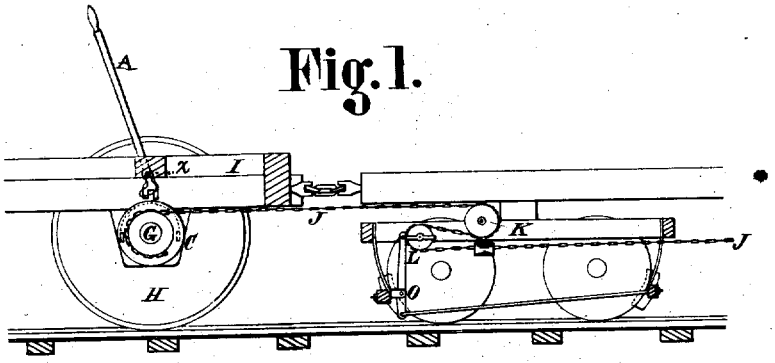
Figure 2:
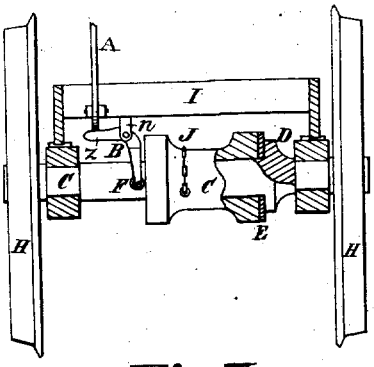
Figure 3:
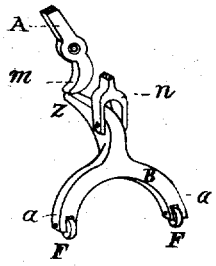

Figure 1 is a sectional view of the foot-plate of a locomotive and the forward truck of its tender, showing the application of the brake thereto. Fig. 2 is a sectional elevation of the hind driving-axle and contiguous parts of the brake; and Fig. 3, a sectional isometrical perspective view, showing the clutch and a portion of the hand-lever.

Like letters of reference indicate corresponding parts in the different figures of the drawing.

My invention relates more especially to that class of car-brakes which are continuous, or in which the brake mechanism of two or more cars may be operated conjointly from the locomotive, or by a single brakeman stationed upon one of the cars; and consists in a novel construction and arrangement of the parts, as hereinafter more fully set forth and claimed, by which a more effective device of this character is produced than was in ordinary use at the time of making my improvement.

In the drawing, A represents the hand-lever of the brake, which is pivoted at *x* in a slot formed in the foot-board I of the locomotive. Projecting vertically from the under side of the foot-board there is a bifurcated lug, *n*, and pivoted at its angle in this lug there is a tri-armed clutch-lever, B, its vertical arms *a a* embracing the axle G of the rear driving-wheels H H, and its horizontal arm *z* working in contact with the lower end of the lever A, which is bent to form the cam or eccentric *m*. Disposed upon the axle G there is a fixed collar, D, and also a spool, C, to which one end of the brake-chain J is firmly secured. This spool is sleeved to form a loose boss upon the axle when its independent movements are not prevented by the conjoint action of the lever A, clutch B, and collar D. Between the end of the spool C and collar D there is a friction-pad, E, and journaled in the ends of the arms *a a* are two friction rollers or wheels, F F. The chain J extends from the spool C around the sheave K, which is journaled to the frame of the tender-truck, and thence around the sheave L on the upper end of the friction-pad lever O, from which it extends to the other pad levers or brakes of the train, being arranged at each set of trucks in like manner. The pad E is designed to be oiled as required, the spool C being lubricated by means of oil-cups. (Not shown.)

From the foregoing it will be readily obvious to all conversant with such matters that when the lever A is moved to maintain the cam *m* in forcible contact with the horizontal arm *z* the wheels F F will be brought laterally against the spool C, compressing the pad E between the spool and fixed collar D, thus causing the spool to revolve with the axle and wind up the chain J, to "brake the train," in a manner which will be fully apparent without a more explicit description.

The object of the pad E, and, in part, of the rollers F F, is to prevent any undue or excessive strain upon the brake-chain, permitting the spool to revolve or slip on the axle without injury when the proper tension has been obtained. The rollers F F also perform another important function in permitting the spool to revolve freely with the axle while holding it against the pad E to induce such movement.

It will be obvious that the principal function performed by the collar D is to resist the end thrust or lateral movement of the clutch-lever B in clamping the spool and causing it to revolve with the axle for the purpose of winding up the chain.

I am aware that prior to my invention a car-brake has been constructed in which a movable spool has been actuated by levers to bring it into contact with a fixed collar upon the axle, and I therefore do not herein claim the same, broadly; but, Having thus explained my invention, what I claim is—

1. In a car-brake, the combination of collar D, frictional pad E, spool C, and devices for forcing the spool against the pad, substantially as and for the purpose set forth.

2. In a car-brake, the lever A, provided with the cam *m*, in combination with the clutch-lever B, substantially as and for the purpose set forth.

3. In a car-brake, the combination of chain J, sheaves K L, pad E, lever O, and spool C, substantially as and for the purpose set forth.

ALBERT F. GUE.

Witnesses:

JAMES CHISHOLM,
T. C. MACMILLAN.